United States Patent
Vered et al.

(10) Patent No.: US 8,223,851 B2
(45) Date of Patent: Jul. 17, 2012

(54) METHOD AND AN APPARATUS FOR EMBEDDING DATA IN A MEDIA STREAM

(75) Inventors: Moshe M. Vered, Kiryat-Ono (IL); Sagi Nagar, Modiln (IL)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1244 days.

(21) Appl. No.: 11/984,875

(22) Filed: Nov. 23, 2007

(65) Prior Publication Data

US 2009/0135919 A1   May 28, 2009

(51) Int. Cl.
*H04N 11/02* (2006.01)
(52) U.S. Cl. .............................. 375/240.29; 375/240.26
(58) Field of Classification Search ............. 375/240.26, 375/240.29, E07.193; 709/203, 217, 218, 709/219
See application file for complete search history.

(56) References Cited

U.S. PATENT DOCUMENTS

| 5,999,977 | A * | 12/1999 | Riddle .......................... 709/227 |
| 6,356,921 | B1 * | 3/2002 | Kumar et al. .................. 715/203 |
| 7,301,944 | B1 * | 11/2007 | Redmond ...................... 709/203 |
| 2003/0217273 | A1 * | 11/2003 | McGrath et al. .............. 713/176 |
| 2007/0016802 | A1 * | 1/2007 | Wingert et al. ............... 713/193 |
| 2008/0016527 | A1 * | 1/2008 | Ching et al. .................... 725/36 |
| 2008/0253465 | A1 * | 10/2008 | Richardson et al. ..... 375/240.26 |
| 2009/0177742 | A1 * | 7/2009 | Rhoads et al. ................ 709/203 |
| 2009/0228570 | A1 * | 9/2009 | Janik et al. .................... 709/217 |

* cited by examiner

*Primary Examiner* — Hassan Phillips
*Assistant Examiner* — Saba Tsegaye

(57) ABSTRACT

A method for enhancing a media file. The method comprises encoding a media file for a real time exchange of communications between a plurality of terminals, embedding a non-media communication of the real time exchange into the media file, and forwarding the embedded media file to at least one of the plurality of terminals.

19 Claims, 8 Drawing Sheets

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| val | 1 | 1 | 1 | 1 | 1 | 1 | 1 | 1 | 1 | 1 | 1 | 0 | 1 | 1 | 0 | 0 |
| hex | F | | | | F | | | | E | | | | C | | | |

Fig. 6

| Bit | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| hex | F | | | | F | | | | A | | | | A | | | | E | | | | C | | | |

Fig. 7

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| val | 1 | 1 | 1 | 1 | 1 | 1 | 1 | 1 | 1 | 0 | 1 | 0 | 1 | 0 | 1 | 0 |
| hex | F | | | | F | | | | A | | | | A | | | |

| Bit | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| hex | F | | | | F | | | | A | | | | A | | | | A | | | | A | | | |

METHOD AND AN APPARATUS FOR EMBEDDING DATA IN A MEDIA STREAM

FIELD AND BACKGROUND OF THE INVENTION

The present invention relates to a method and an apparatus for embedding data in a file and, more particularly, but not exclusively to a method and an apparatus for embedding non media data in a media file, such as a video file, an audio file, and/or an audiovisual file.

During the last decade, media files have become a useful tool for storing media data and transmitting it via communication networks. The media files, which include video, audio, and/or audiovisual files are commonly used as carriers for content such as music, segments of a video recording, speech sections, gestures, visual expressions, and vocal expressions. Usually, the media files are encoded in accordance with a pre-set standard. Each standard generally specifies a protocol for encoding content such that it may be stored or transmitted, and a protocol for decoding content that has been encoded to reconstruct the content for playback. A device or a module that implements one or more of these protocols may be referred to as a coder-decoder (CODEC). The media files that comprise the encoded content, which may be stored on digital media, such as a hard disk drive or a flash memory and/or based on real time recording, are transmitted via a communications network. As both storage and network bandwidth has associated costs, the CODEC is usually designed to compress the digital representation of the content while maintaining a desired level of quality. During the compression, the media content is compressed to render it less bulky for transfer. The CODEC encodes received media signals into digital data and compresses them into frames which are then transported over the communication network. At the destination, these frames are decompressed and optionally converted to analog if needed.

For music, a number of CODECs exist, including motion picture experts group (MPEG)-1 audio layer-3 (MP3), advanced audio coding (AAC) and windows wave (WAV). Similarly, for video, the CODECs include, but are not limited to, MPEG-2, MPEG4, audio video interleave (AVI) and windows media video (WMV).

The encoding of video, audio, and/or audiovisual signals into media files allows the streaming thereof across the Internet or other network environment. Streaming media refers to audio, video, and multimedia signals, which are delivered to a user terminal via the network, and begin to play on the user terminal before delivery of the entire media file is completed. The streaming allows the user terminal to start playing a media file before it has been entirely downloaded, saving the user the wait typically associated with downloading the entire file.

SUMMARY OF THE INVENTION

According to one aspect of the present invention there is provided a method for enhancing a media file. The method comprises encoding a media file for a real time exchange of communications between a number of terminals, embedding a non-media communication of the real time exchange into the media file, and forwarding the embedded media file to at least one of the plurality of terminals.

Optionally, the non-media communication is mostly unencoded.

Optionally, the forwarding comprises streaming the embedded media file to a participant of the real time exchange.

Optionally, the media file comprises media signals, further comprises recording the media signals in real time before the encoding.

Optionally, wherein each the terminal is a member of the group consisting of: a user terminal, a central server, an interface node, and a cellular phone.

Optionally, the real time exchange is a member of the group consisting of: a game session, a commerce session, a conference call, and a video conference call.

Optionally, the media file comprises a number of frames each having a frame identifier, further comprises encoding the non-media communication to reduce segments having a value substantially similar to the value of the frame identifier.

According to one aspect of the present invention there is provided a method for decoding an embedded media file. The method comprises providing a media file embedded with non-media data, at least 50% of the non-media data being unencoded, extracting the non-media data from the media file, decoding the embedded media file while ignoring the non-media data, and using the non-media data in an interactive session including a real time exchange of communications between a number of terminals.

Optionally, the non-media data comprises a communication of a data session held between a creator of the non-media data and a player of the non-media data.

Optionally, the decoding and the using are performed together.

Optionally, the embedded media file comprises a number of media frames each having a media frame tag and a number of data session frames each having a data session tag, the decoding comprises playing information stored in the plurality of media frames while ignoring the plurality of data session frames.

According to one aspect of the present invention there is provided a method for embedding non-media data in a frame based file. The method comprises: providing non-media data and a frame based file having plurality of frames each having a frame identifier, changing segments of the non-media data having the same value as the frame identifier, embedding the non-media data unit into the file, and outputting the embedded media file.

Optionally, the changing is performed while leaving most of the non-media data encoded.

Optionally, the changing comprises adding a dummy value to the segment.

Optionally, the frame based file is a motion picture experts group (MPEG)-1 audio layer-3 (MP3) file and the frames being MP3 frame.

According to one aspect of the present invention there is provided a mobile communication terminal for participating in an interactive session between a number of participants. The mobile communication terminal comprises an encoding module configured for encoding a media file for a real time exchange of communications between a number of participants, an embedding module configured for embedding a communication of the interactive session into the media file without encoding the at least 50% thereof, and an interactive data session module configured for using the embedded media file in the real time exchange of communications.

Optionally, the media file comprises a number of frames each having a frame identifier, further comprises an encoding device configured for encoding the communication, thereby to reduce segments having a value substantially similar to the value of the frame identifier.

Optionally, the communication is a member of the group consisting of: a game session, a commerce session, a conference call, and a video conference call.

Optionally, the mobile communication terminal is a cellular phone, the interactive session being performed via a cellular network.

According to one aspect of the present invention there is provided a system for establishing a real time exchange of communications between a number of participants via a communication network. The system comprises a sending communication terminal configured for embedding a media file with a non-media communication of the real time exchange and wirelessly sending the embedded media file over a wireless network and a receiving communication terminal configured for receiving the embedded media file via the wireless network and playing the media file and processing the non-media communication together.

Optionally, the receiving communication terminal comprises a decoding unit for playing the embedded media file, the sending communication terminal being configured for concealing the non-media communication from the decoding unit.

Optionally, the media file comprises a number of frames each having a frame identifier, the sending communication terminal being configured for concealing the non-media communication by reducing segments having a value substantially similar to the value of the frame identifier before the embedding.

According to one aspect of the present invention there is provided a mobile communication terminal for participating in an interactive session in a real time exchange of communications between a number of participants. The mobile communication terminal comprises a decoding module configured for receiving a media file embedding a communication of the real time exchange and decoding the media, an extracting module configured for extracting the communication, and an interactive data session module configured for using the communication during the interactive session.

Optionally, the decoding module is configured to perform the decoding while ignoring the embedded communication.

According to one aspect of the present invention there is provided a method for executing a game. The method comprises providing a media file embedding a resource file of a game, and executing the resource file and decoding the media file together.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 6 is a schematic illustration of an MP3 frame with a syncword;

FIG. 7 is an encoded target buffer that includes the frame depicted in FIG. 6 and a jam value, according to one embodiment of the present invention;

FIGS. 8 and 9 respectively depict a segment of non-media data that includes a string of bits that has the same value of a jam value and a segment of non-media data that includes the string of bits and a duplicated version thereof;

DESCRIPTION OF THE OPTIONAL EMBODIMENTS

Figure 1:
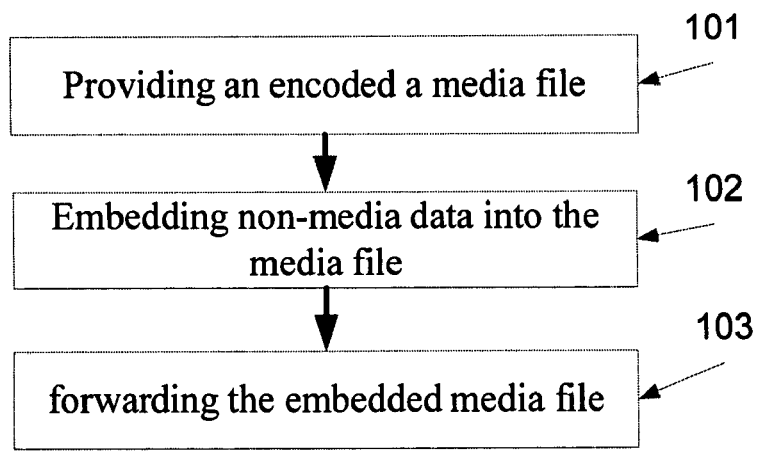
FIG. 1 is a flowchart of a method for enhancing a media file with non-media data such as a communication of an interactive session or a resource file, according to embodiments of the present invention.

Some embodiments of the present invention comprise an apparatus and a method for embedding non-media data in a media file that includes media data, such as an audio, video, and/or audiovisual file. The embedded non-media data, which may be a resource file of a game or data of an interactive session in a real time exchange of communications between terminals, may reduce the sum of the computational complexity that is needed for playing the media data and processing the non-media data.

Some embodiments of the present invention describe a method for enhancing a frame based media file, such as an MP3 file. The method comprises providing a media file which is encoded according to an encoding protocol, such as the protocol that is defined in the MP3 standard, which is incorporated herein by reference, and embedding non-media data, such as a communication of a real time exchange of communications into the media file. The real time exchange of communications may be referred to as an interactive session.

As further described below, most of the non-media, data is not encoded, allowing the decoding thereof with relatively low computational complexity, optionally by devices with relatively limited computational abilities, such as cellular phones and PDAs.

The method may further comprise forwarding the embedded media file to a participant of the interactive session. Optionally, the embedded media file may be streamed in real time during the aforementioned interactive session. In such an embodiment, the embedded media file combines the non-media data, which may include event messages, instructions, and updates, with media data in one file, as further described below. Such an embedding reduces the bandwidth that is needed for an interactive session as it allows participants thereof to use a common channel for sending media files and session communications. For example, if the interactive session is a game session, such as a music game, wherein the embedded media file may include a music segment, which is created and/or manipulated by the user, and a communication that is related to the session, such as status, game instructions, game related event messages, etc.

Some embodiments of the present invention describe a method for embedding non-media data in a frame based file such as an MP3 file. In this method, a frame based file that encodes media signals is embedded with non-media data, such as session communication. As commonly known, a frame based file, such as an MP3 file, comprises a plurality of frames of encoded media data each having a frame identifier, such as a syncword, that is used for synchronizing the encoded media data during the decoding thereof. Optionally, the non-media data, which is about to be embedded into the frame based file, is encoded and segments that have a value that may be detected as a syncword are added with a dummy value. Such an encoding assures that these segments are not detected as frame identifiers, such as syncwords, during the decoding thereof and to assure that these segments do not change the output of the decoding process. After the segments of the non-media data have been added with the dummy value, the non-media data is embedded into the frame based file. The non-media data is embedded almost completely as is into the frame based file. Optionally, the non-media data is divided into frames that have headers, which are not recognized by a related decoder, such as an MP3 decoder.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

Reference is now made to FIG. 1, which is a flowchart of a method for enhancing a media file with non-media data, such as resource file of a game and/or communications of an interactive session that is held between participants, according to embodiments of the present invention. A resource file may be understood as a source file, a file that contains language-dependent string text and/or specifications of one or more game elements, such as user interface elements, and/or a compiled file that defines the resources that are used by the game. An interactive session may be understood as a session in which a series of communication exchanges between participants of the interactive session occur in real time. Examples for interactive sessions may be game sessions or video and/or audio based communication sessions, multidirectional communication sessions, multiparty communication sessions, for example video and/or audio conference calls, commerce sessions, or any other multidirectional session that involves forwarding, such as streaming or transmitting, of media files. The game session may be understood as a media game, such as a music and video game, wherein the user sends a media segment, a short segment of audio and/or video, to another user or a computer that participates in the game.

A participant of an interactive session may be understood as a user terminal, a computing unit, a central server, an interface node, and a cellular phone, or any other terminal or network node that may participate in an interactive session.

The session communication may be understood as updates, event messages, instructions, status messages, and any other non-media data that is streamed between any two participants of the interactive session. In one exemplary embodiment, the interactive session is a music game session wherein a participant creates and/or manipulates music segments which are streamed another participant and/or to a server as media files. In such an embodiment, the method allows the participant that creates and/or manipulates the music segments to embed session communications, such as game instructions, game status, and the current state of the game of a pawn in the game, into the media file that is sent during the interactive session.

A media file may be understood as an audio file such as an MP3 file, an AAC file, and WAV file, a video file, or an audiovisual file such as MPEG file, AVI file, and WMV file.

First, as shown at 101, an encoded media file is provided. The media file may be received from a storage unit or locally encoded from recorded or received media signals. Now, after the encoded media file has been provided, as shown at 102, one or more session communications and/or game resources are embedded into the encoded media file.

As further described below, the method allows the embedding of non-media data in media files. As further described below, when the non-media data includes session communications, such an embedding reduces the required bandwidth and improves the response rate of participants in the interactive session. The method may be used for enhancing media files, which are streamed and/or forwarded during in interactive sessions. In such an embodiment, the media file may be a communication file that is used in an interactive media game wherein a user uses a communication terminal, such as a cellular phone, a smart phone or a personal digital assistant (PDA), for sending and/or receiving media files via the wireless networks.

The media files include media signals in a digital form. Optionally, if the media signals are intercepted in an analog form, as continuous signals, for example using a microphone or the like, an analog-to-digital converter (ADC) is used to convert it to a digital form that corresponds with discrete digital numbers. The content that is represented in the intercepted media signals is optionally encoded using a CODEC that compresses it while maintaining a desired level of quality. If the media signals correspond with audio content, the digital data CODEC compresses it according to an audio compressing protocol such as MP3, AAC and WAV. If the intercepted signals correspond with video and/or audiovisual content, the digital data CODEC compresses according a corresponding protocol, such as MPEG-2, MPEG4, AVI, and WMV. Optionally, the encoded content is divided into a number of different frames.

In some embodiments of the present invention, the media file comprises a number of media data frames each contains a segment of the media data that is stored in the media file and a synchronization tag. Optionally, the media file is an MP3 file that comprises a number of media data frames each having a header with a synchronization tag, which is also known as a syncword. Optionally, before the media file is embedded, segments of the data that is about to be embedded and have the same or substantially the same value as the synchronization tag of the media data frames are encoded in a manner that these segments cannot be decoded as synchronization tags of the media data frames. Optionally, each one of these segments is added, reorganized, or replaced with a dummy value that changes the output of the decoding thereof by a media decoder, for example as described below. Optionally, the data that is about to be embedded is split into data frames each having a synchronization tag, optionally in a header, which is different from the synchronization tag of the media data frames. In such a manner, data may be embedded into the media file without changing the output of the decoding thereof.

It should be noted that as most of the embedded non-media data is not encoded, the decoding of the embedded data may be done with relatively low computational complexity, optionally by devices with relatively limited computational abilities, such as cellular phones and PDAs.

As the media files may be encoded according to different protocols, the embedding is optionally adjusted according to the encoding protocol that is used to encode the media file.

As described above, in one embodiment of the present invention, non-media data may be a resource file of a game. In such an embodiment, the resource file may be played together with the playing of the embedded media file. As further described below, the embedded resource file is not decoded during the playing of the embedded media file and the media data of the embedded media file is not executed as part of the resource file.

After the media file has been embedded, as shown at 102, it is forwarded, optionally to a participant of aforementioned the interactive session. Optionally, the method is executed by a communication terminal, such as a cellular phone, for embedding event messages, which are related to a multiplayer game session in an audio file that is created by the user of the communication terminal. The multiplayer game session may include one or more additional participants such as other users, game servers, and/or communication servers. In such an embodiment, the embedded media file is optionally transmitted to one or more other participants of the game session. An example for such a game session is a multiplayer music game in which a number of players, which may be referred to as band members, participate. Each player uses a different communication terminal. During the game session, the band members are playing a song together. A communication terminal of one of the players, which may be referred to as a master player, hosts all the resources which are needed for playing the song. These resources may include background music, game rules, graphic objects, and metadata that is relevant for the game session. Optionally, the resources are embedded into one music resource file. After the communication terminal of the master player is connected to one or more of the other band members, it checks the status of the communication terminal of each band member to verify which resources they may need for playing the song. If one of the communication terminals does not have the resources, which are required to participate in the game, the communication terminal of the master player provides them thereto.

Optionally, the interactive session is a virtual lesson, a course, a lecture, a vocal study guide, or any other type of audiovisual presentation. In such an embodiment, the forwarded embedded media files may include video and/or audio streams depicting and/or recording a lecture in which a presentation, such as a PowerPoint™ presentation, is presented. The session communications, which are embedded into the media file, may include the aforementioned presentation, graphical objects thereof, and/or graphical instructions for manipulating the graphical objects. Optionally, the instructions are sent in accordance with the progress of the lecture, optionally in conjunction with the manipulations the lecturer applies on the presentation during the lecture. In such a manner, both a recording of the lecture and information that allows the displaying of the presentation are send on the same stream, allowing the user terminal to play the lecture and to display the lecture intermittently or simultaneously.

Figure 2:
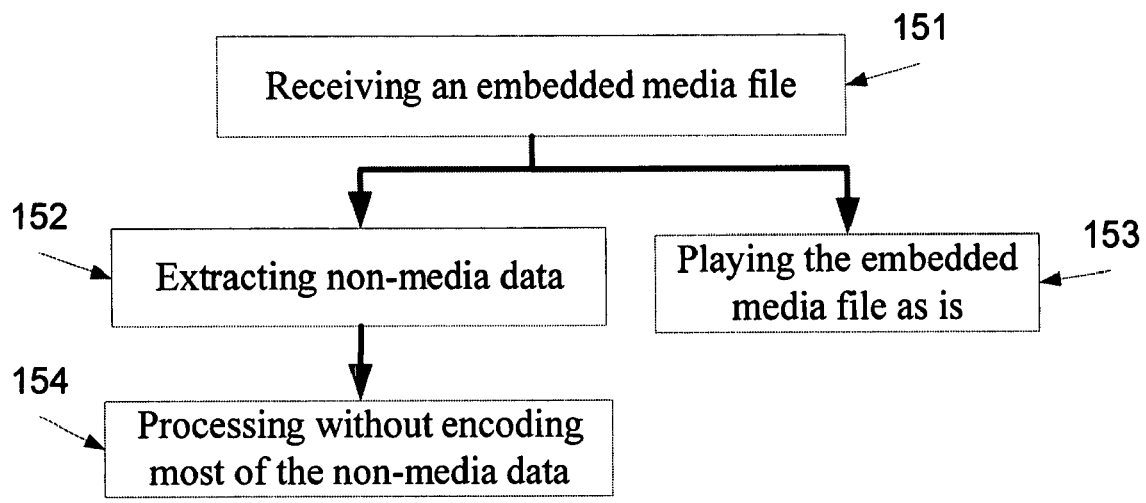
FIG. 2 is a flowchart of a method for decoding an embedded media file, according to embodiments of the present invention.

Reference is now made to FIG. 2, which is a flowchart of a method for decoding a media file that is embedded with non-media data such as communications of an interactive session, according to one embodiment of the present invention. As described above, a media file, such as an audio and/or video file, may be streamed and/or forward in an interactive session, such as a game session, embeds non-media data such as related session communications, such as game instructions. As shown at 151, the embedded media file, which is sent by one of the participants or servers via a network, such as a cellular network, which are involved in the interactive session, is received at a user terminal of one of the other participants or at a server that is involved in the interactive session, as shown at 152. The receiving end can now extract the session communication from the media file. As described above, the session communication is embedded into frames, which are different from the media data frames and can be extracted without further processing of the embedded media file. Then, as shown at 153, the extracted session communication is processed. As shown at 154, the received embedded media file is played as is, without extracting the embedded data and/or separating between the media data and the non-media data. As described above, the session communication is embedded in a manner that it not detected by media decoders. Optionally, the session communication is embedded into the media file in frames. Each frame has a synchronization tag, which is different from the synchronization tag of the media data frames, and the media decoder, which is used for decoding the embedded media file, ignores them. It should be noted that step 153 may be performed before, during, and/or after steps 152 and 154.

As described above and exemplified below, small segments of the non-media data may be encoded in order to avoid the decoding thereof by the decoder of the media data that is stored in the media file. However, the number and size of these segments is limited and therefore most of the non-media data is left unencoded. As the non-media data is mostly unencoded, the decoding thereof is performed with relativity low computational complexity, allowing the usage of processors with limited computational power. Furthermore, such methods facilitate faster communication and reduce the computational complexity of the streaming itself as the user terminals of the participants handle a single stream that comprises media and non-media data instead of handing two different streams.

Figure 3:
FIGS. 3 and 4, which are respectively schematic illustrations of segments of an MP3 file and segments of an MP3 file which is embedded with non-media data, according to embodiments of the present invention.
Figure 4:
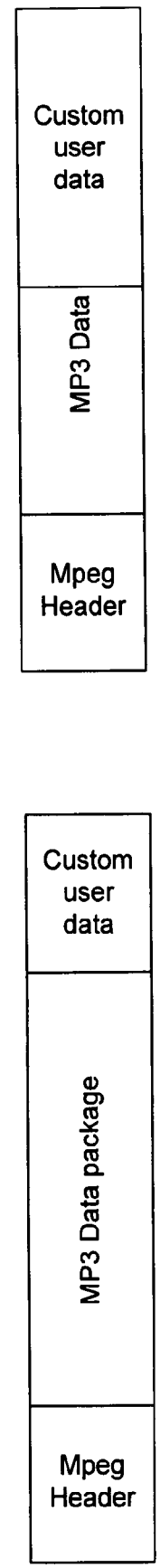

Reference is now made also to FIGS. 3 and 4, which are respectively schematic illustrations of segments of an MP3 file 300 and an MP3 file that is embedded with non-media data, according to embodiments of the present invention.

As described above, the embedding of the non-media data into the encoded media files which may be adjusted according to the encoding protocol. The description provided in relation to FIGS. 3, 4, and 5 is related to a method for embedding non-media data into a media file that is encoded according to MP3 protocol.

As commonly known, an MP3 file is a computer file that contains compressed digital audio data optionally to transmit music over a communication network, such as the Internet. The standard of the MP3, which is incorporated herein by reference, defines a method for digitally representing audio information. The audio information in the MP3 file is compressed and divided into frames 301. According to the MP3 standard, each frame 301 has a header 302, optionally 32 bits long, and side information that is 9, 17, or 32 bytes long, depending on the MPEG version and stereo/mono. All the frames of a certain file can be identified by their headers, allowing the extracting of the compressed information from all the related frames. Once this information is extracted, the audio information can be catenated or sequentially processed. The processing or the catenating of the frames ignores any segment of information within the file that does not preside with a valid MP3 header that is followed by a valid frame.

According to the MP3 standard, the first word of the header 302 of each frame 300 is a string of bits, optionally 11 bits long, which is used as a synchronization tag that may be referred to as a syncword. According to the MP3 standard, the syncword value is 0xFFE. During the decoding process, a frame is identified according to its syncword. The syncword indicates the beginning of the frame, allowing a decoder to parse it and optionally to play or process the audio information that is encoded therein.

Figure 5:
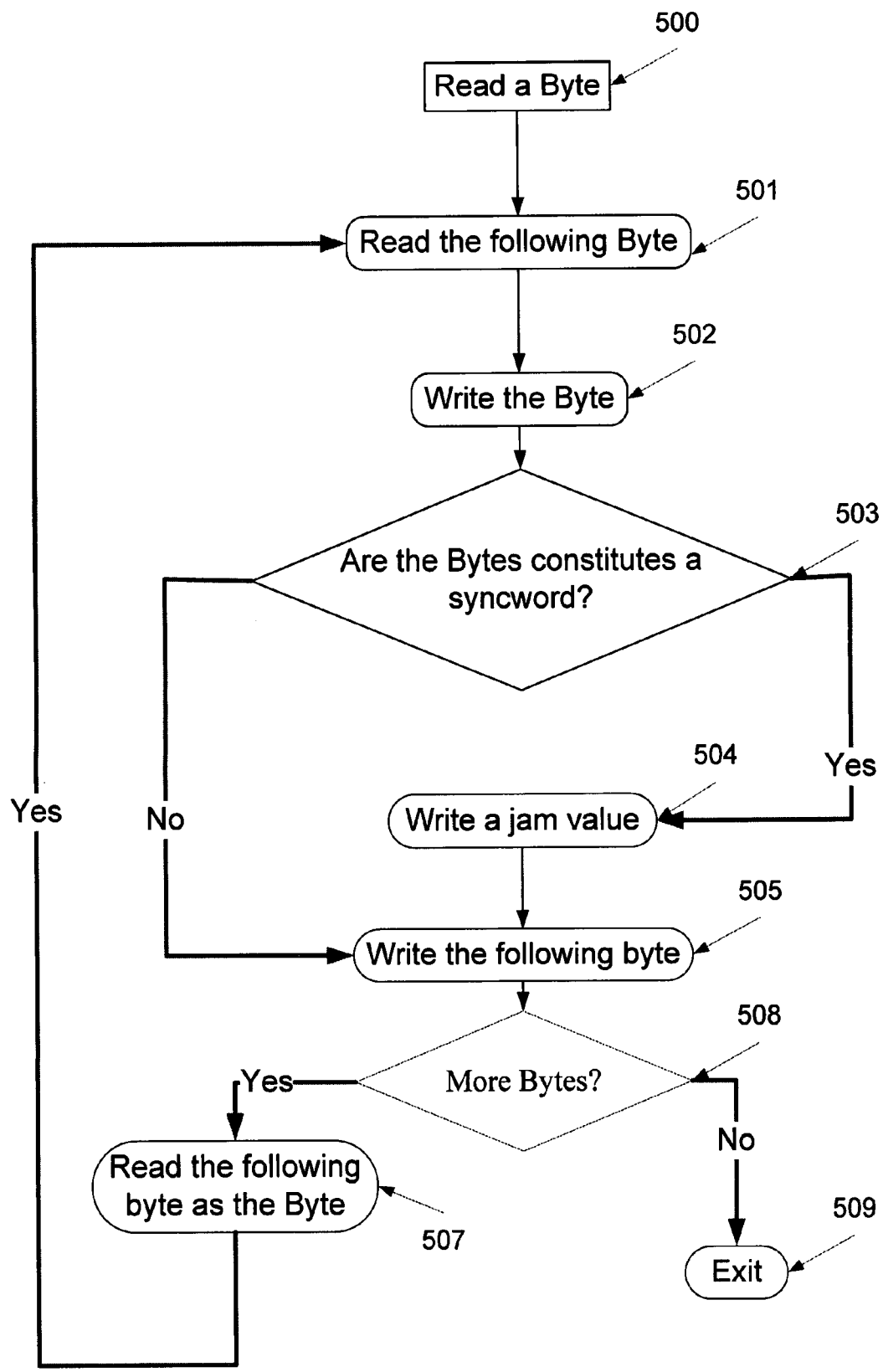
FIG. 5 is a schematic illustration of a method for encoding non-media data, such as session communication, before it is embedded into an MP3 file, according to embodiments of the present invention.

Reference is now made to FIG. 5, which is a flowchart of a method for encoding non-media data before it is embedded into an MP3 file, according to embodiments of the present invention. As described above, such an encoding is performed before an MP3 file is embedded with the non-media data. As described above, during the decoding process, each frame in the MP3 file is identified and parsed. The frames are identified according to the syncword that is positioned in the beginning of each frame.

In order to embed non-media data into the MP3 file without changing the parsed information, segments of the non-media data that include a string of bits having a value, which is similar or substantially similar to an MP3 syncword, which is optionally 0xFFE, are identified and altered. In such a manner, the embed data is not decoded as an MP3 frame or as a part of an MP3 frame. Optionally, strings of bits, which may be identified as syncwords and comprise the non-media data, are altered by adding a separation value or string that may be understood as a jam value. The jam value can be any value that alters the syncword, for example as 0xAA.

As shown at 500 and 501, two sequential bytes of the non-media data are read. Then, the former byte is written to an encoded target buffer or array, as shown at 502. Now, as shown at 503, it is verified that the former and later bytes do not constitute a syncword of an MP3 frame. If the former byte equals to the first byte of the syncword, for example if it is equals to 0xFF, and the later byte equals to the second byte of the syncword, for example if it is equals to 0xEx, than a jam value is written into the encoded target buffer or array, as shown at 504.

Now, after the jam value is written, the later byte is also written into the encoded target buffer or array, as shown at 505. For instance, if the former byte equals to 0xFF 600 and the later byte equals to 0xEx 601, as shown at FIG. 6, which is a schematic illustration of an MP3 frame 602 with a syncword, a jam value is written into the encoded target buffer or array, for example as shown at FIG. 7, which is an encoded target buffer 603 that includes the frame depicted in FIG. 6 and the jam value 0xAA 604, according to some embodiment of the present invention.

As described above, the two bytes that comprise the syncword may be understood as a syncword when they are read as a sequence. In the method depicted in FIG. 5, these two bytes are separated by a jam value that prevents from a MP3 decoder to decode them sequentially.

It should be noted that the non-media information may include one or more strings of bits that have the same value as the jam value. In order to avoid the decoding of such strings of bits as jam values, these strings of bits are optionally duplicated when they are added to the encoded target buffer and/or array. For example, FIGS. 8 and 9 respectively depict a segment of non-media data 700 that includes a string of bits 701 that has the same value of a jam value, optionally 0xAA, and a segment of non-media data 702 that includes the string of bits 701 and a duplicated version thereof 703.

Optionally, the only encoding process that may be applied to the non-media data is the duplicating of segments that have a value that is equal to the jam value, as described above. As most of the non-media data is left unencoded, it can be processed with relativity low computational complexity.

As shown at 506 and 507, if there are more bytes in the non-media data, the following bytes are encoded according to 500-507. However, as shown at 508-509, if the second byte is the last byte in the file, the process is ended and the encoded target buffer, which is filled with the encoded version of the non-media data, is ready to be embedded into the MP3 file.

Reference is now made, once again, to FIG. 1. After the non-media data has been encoded, as shown at 101, it is embedded into the media file that is optionally an MP3 file, as shown at 102. Optionally, the encoded non-media data is embedded alongside the MP3 frames, optionally in the end of MP3 frames, for example as depicted in FIG. 4.

Optionally, the encoded non-media data is divided into non-media data frames each added in the end to an MP3 frame or in between MP3 frames. Optionally, each non-media data frame is marked with a signature, a header, or another tag that marks it as a container of non-media data.

Figure 10:
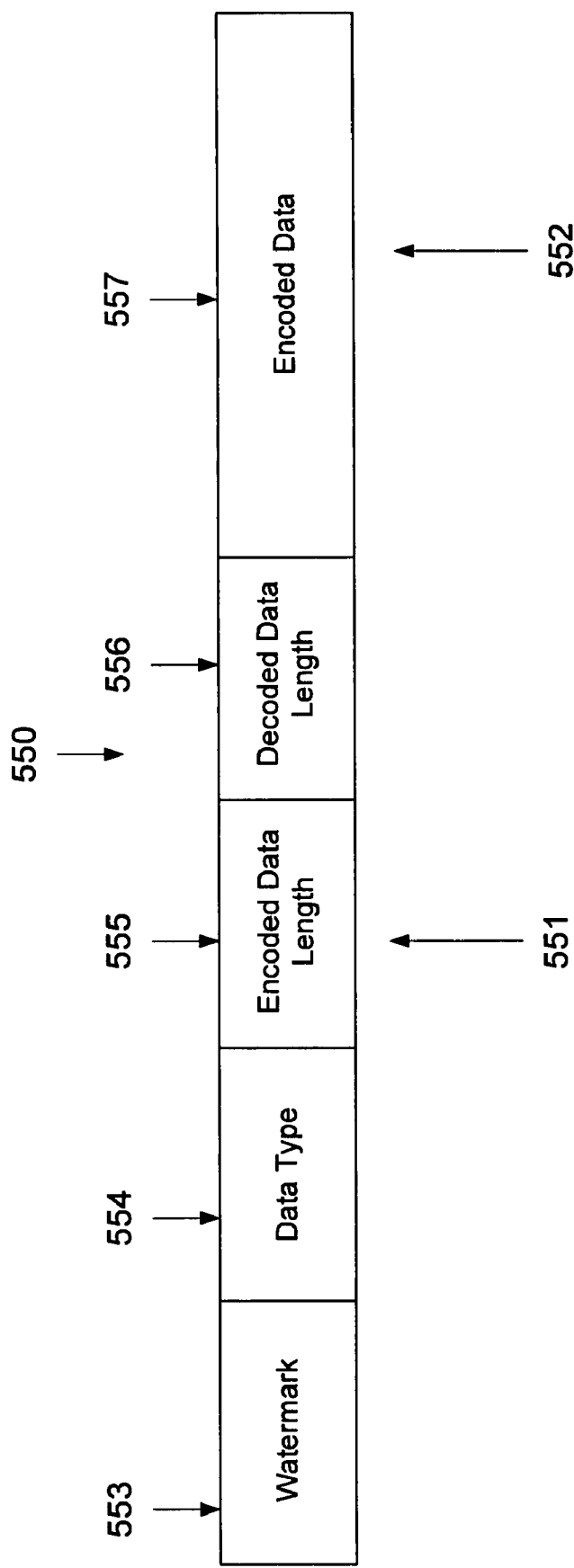
FIG. 10 is a schematic illustration of an exemplary non-media data frame, according to embodiments of the present invention.

Reference is now made to FIG. 10, which is a schematic illustration of an exemplary non-media data frame 550, according to embodiments of the present invention. Optionally, the non-media data frame 550 has a header 551 and a body 552, wherein the body 552 includes the encoded non-media data and the header 551 comprises a watermark record 553, a data type record 554, an encoded data length record 555, and a decoded data length record 556.

Optionally, the watermark record 553 is a unique mark that signifies the beginning of the non-media data frame 550. It should be noted this unique mark cannot include a sequence of bits that might be identify as the jam value.

Optionally, the data type record 554 includes a value that corresponds with the size of each unit that comprises the encoded data, for example a byte, which is 8 bits, that describes the encoded data section of the frame. It should be noted this record does not include the jam value or any value that can be read as the jam value when it read in sequence after the watermark. Optionally, the data type record 554 includes a first type record that contains a value that is used for the decoding of the encoded data 557 and second field that holds controlling information for the decoder, such as the number of frames which are embedded in the media file, the existence or non-existence of trailing data frames etc.

Optionally, the encoded data length record 555 includes a value that corresponds with the length, optionally in bytes, of the body of the frame 550. The base size of this field is optionally 32 bits.

Optionally, the decoded data length record 556 includes a value that corresponds with the decoded data length, optionally in bytes, of the non-media data, a decoded form, which is encoded in the frame. This field is used as a controlling to make sure all data had been extracted from the Encoded Data. The base size of this field is optionally 32 bits.

Reference is now made, once again, to FIG. 1. Now, as shown at 103, the embedded media file, which is optionally an embedded MP3 file, is used. Optionally, the embedded MP3 file is streamed to another user or computer, as described above.

Figure 11:
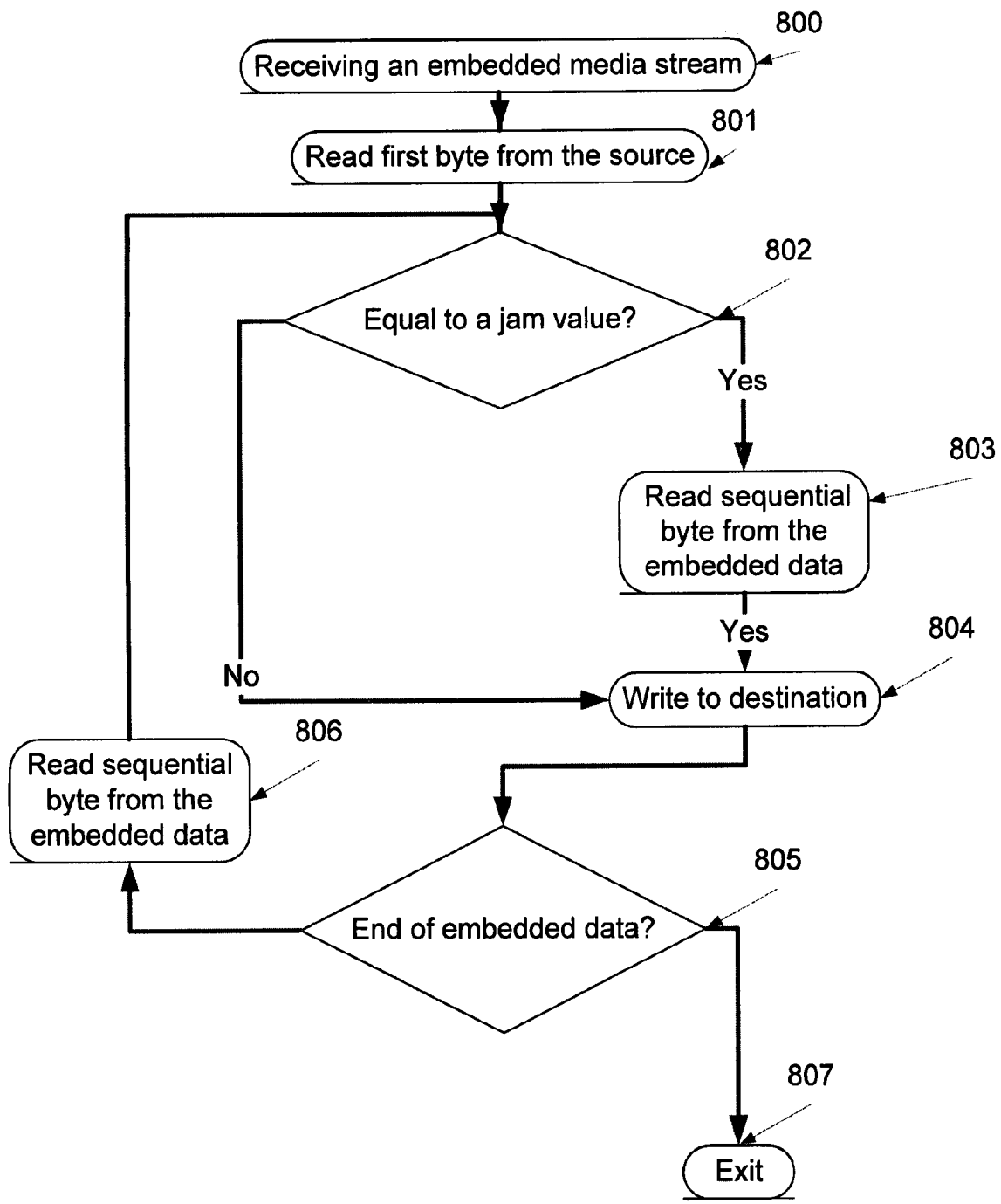
FIG. 11 is a flowchart of a decoding process for decoding non-media data that is embedded into an MP3 file, according to embodiments of the present invention.

Reference is now made to FIG. 11, which is a flowchart of a decoding process for decoding the non-media data that is embedded into the MP3 file, according to embodiments of the present invention.

First, an embedded MP3 file is received, optionally via a network from a participant of a communication session, as shown at 800. Then, as shown at 801, the first byte of the communication session is read, as shown at 801. If the value of the byte of the communication session and the jam value are different, as shown at 804, the byte in the embedded media file is read. If the byte of the communication session and jam value has a similar value, as shown at 802 and 803, the sequential byte in the embedded media file is read. In such a manner, the jam values are ignored and not decoded during the decoding of the embedded media streams. Now, as shown at 804, the byte is written to a destination address, such as a decoded target buffer or a decoded target array. It should be noted that strings of bits that represent non-media data and have the same value as a jam value have been duplicated during the encoding process, optionally as described above, and therefore are not lost during such a decoding process. As shown at 805, 806, and 807 the decoding process is repeated for all the bytes in the media file.

As described above, the non-media data may be embedded into media streams which are encoded according to different protocols. These media streams may include media signals, such as audio signals, for example, MP3 streams. These media streams may include digital data that includes event messages, such as the pitch and the intensity of musical notes to play, control signals for parameters such as volume, vibrato and panning, cues and clock signals to set the tempo. The non-media data may be embedded relatively efficiently into media streams encoded according to protocols, which are insensitive or relatively insensitive to trashing data, such as undefined data segments, for example data segments which are not defined exactly according to the formal set of conventions governing the format of packets according to the protocol.

Figure 12:
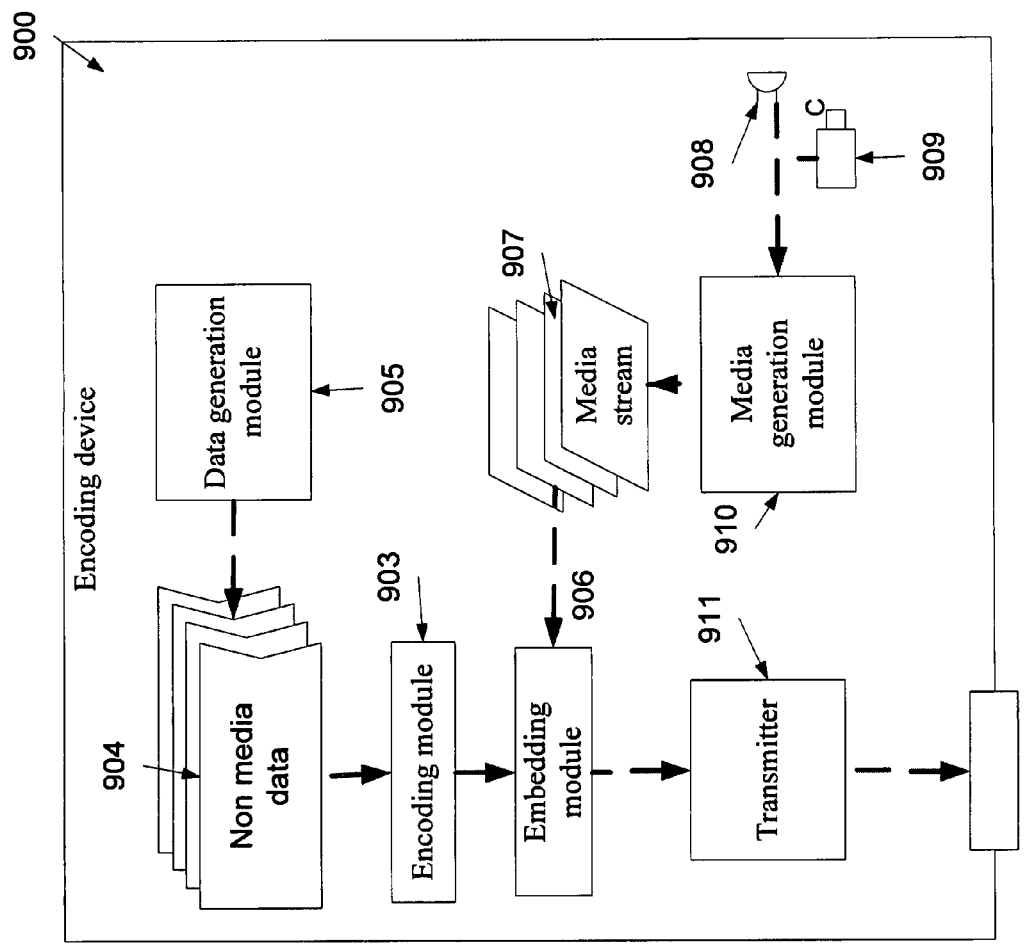
FIGS. 12 and 13 are respectively schematic illustrations of an encoding device 900 and a decoding device 901, according to embodiments of the present invention.
Figure 13:
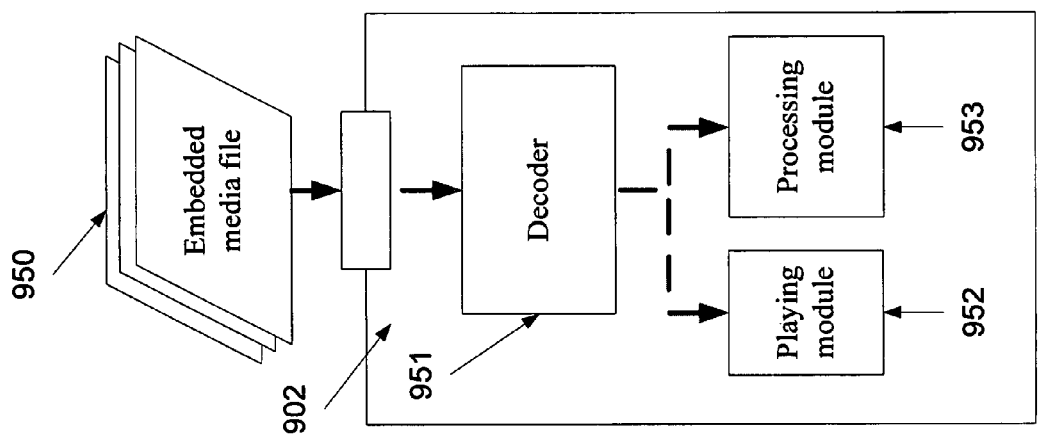

Reference is now made to FIGS. 12 and 13, which are respectively schematic illustrations of an encoding device 900 and a decoding device 901, which are optionally mobile communication terminals, such as cellular phones, smartphones, and/or PDAs, according to embodiments of the present invention. The encoding and decoding devices 900, 901 may be integrated into a single device, such as a communication terminal, for example a cellular phone that is designed to process non-media data, such as session communication, optionally according to embodiments of the present invention.

The encoding device 900, which is depicted in FIG. 12, is designed for generating non-media data 904 and embedding it in media files, optionally as described above. The encoding device 900 comprises an encoding module 903 that receives the non-media data 904 from a data generation module 905 and encodes it, optionally as described above. Optionally, the data generation module 905 is connected to a user interface (UI) and/or comprises a processing module that generates event messages which are based on actions of the user of the encoding device 900.

The encoded session communication is forwarded to the embedding module 906 that receives one or more media streams 907 from a media generation module 910, such as a music player, a music recorder or a digital musical instrument. The embedding module 906 embeds the encoded session communication onto the received media streams 907, optionally as described above. The media generation module 910 may include a microphone 908 for intercepting audio signals, a camera 909 for intercepting video signals, etc. Optionally, the media generation module 910 comprises an ADC that converts the intercepted signals to a digital file that comprises discrete digital numbers. Optionally, the media generation module 910 is connected to a playing module that allows the user of the encoding device 900 to insert instructions for generating audio ad/or video signals. Optionally, the playing module allows the user to participate in an interactive media game, such as an interactive music game, wherein the user enters instructions of or pertaining to music.

After the embedding module 906 embeds the session communication into the media streams, it forwards the embedded file to a transmitter such as a Global System for Mobile Communications (GSM) modem or another wireless interface such as a wireless personal area network (WPAN) interface, and/or a wireless local area network (WLAN) interface. The transmitter forwards, transmits, and/or streams the embedded file to another participant of the interactive session.

The WPAN interface is used for setting up a communication link with one or more local communication entities, such as mobile phones, in the proximity to the device. Optionally, the wireless interface that establishes the WPAN comprises a short-range radio interface, such as a Bluetooth™ transceiver, which is defined according to IEEE 802.15.1 specification that is incorporated herein by reference, optionally utilizing a Bluetooth™ enhanced data rate (EDR) chip that is defined according to Bluetooth™ core specification version 2.0+ EDR of the Bluetooth™ special interest group (SIG), which is incorporated herein by reference, or a Wibree® transceiver. Optionally, the WPAN interface comprises a radio transceiver that uses ultra-wideband (UWB) frequencies. In such an embodiment, the wireless interface 3 may establish the WPAN 4 according to WiMedia™ specification or according to the Wireless USB (WUSB), which are incorporated herein by reference.

The WLAN interface allows the device 900 to establish a connection with another computing module, either directly or via the internet and the access point, as described below. It should be noted that the WPAN and the WLAN interfaces may be implemented on different chips or on the same chip.

The decoding device 902, which is depicted in FIG. 13, is designed for decoding embedded media streams 950, optionally as described above. The decoding device 902 comprises a decoding module 951 that receives the embedded media file 950, optionally as a stream from a central server and/or from a participant of a media session, such as an interactive game session, and decodes it, optionally as described above. Optionally, the decoding module 951 is a connected to a playing module 952 and to a processing module 953. The decoding module 951 extracts session communications which are embedded into the embedded media file, optionally as described above, and forwards the extracted data to the non-media processing module 953 that process them. For example, session communication may include event messages that represent a movement of a virtual object in a game, a status of the sending user, etc.

The decoding module 950 forwards the embedded media file to the playing module 952. The playing module 952 optionally comprises a media player for playing the embedded media file.

It is expected that during the life of this patent many relevant devices and systems will be developed and the scope of the terms herein, particularly of the terms a media file, a communication session, non-media data, and a game session are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method for enhancing a media file, comprising:
    encoding a media file for a real time exchange of communications between a plurality of terminals, said media file comprising a plurality of media frames each having a media frame identifier;
    encoding a non-media communication of said real time exchange to reduce segments having a value substantially similar to the value of said media frame identifier;
    embedding said non-media communication into said media file, wherein said non-media communication comprises a plurality of non-media frames each having a non-media frame identifier; and
    forwarding said embedded media file to at least one of said plurality of terminals.

2. The method of claim 1, wherein said non-media communication is mostly unencoded.

3. The method of claim 1, wherein said forwarding comprises streaming said embedded media file to a participant of said real time exchange.

4. The method of claim 1, wherein said media file comprising media signals, further comprising recording said media signals in real time before said encoding.

5. The method of claim 1, wherein each said terminal is a member of the group consisting of: a user terminal, a central server, an interface node, and a cellular phone.

6. The method of claim 1, wherein said real time exchange is a member of the group consisting of: an interactive game, a commerce session, a conference call, and a video conference call.

7. The method of claim 1, wherein said media file comprises a plurality of media frames each having a media frame identifier.

8. The method of claim 1, further comprising obtaining said media file and said non-media communication from separate sources.

9. The method of claim 1, wherein said non-media communication is embedded non-synchronously within said media file.

10. A method for embedding non-media data in a frame based file, comprising:
    providing non-media data and a frame based file having plurality of frames, each of said frames having a frame identifier;
    identifying segments of said non-media data having the same value as said frame identifier;
    changing each of said identified segments so as to prevent said segments from being read as said frame identifier;
    embedding said non-media data unit into said file; and
    outputting said embedded media file.

11. The method of claim 10, wherein said changing is performed while leaving most of said non-media data encoded.

12. The method of claim 10, wherein said changing comprises adding a dummy value to said segment.

13. The method of claim 10, wherein said frame based file is a motion picture experts group (MPEG)-1 audio layer-3 (MP3) file and said frames being MP3 frame.

14. The method of claim 10, wherein said changing comprises inserting a jam value within each of said identified segments, said jam value comprising a data string.

15. A mobile communication terminal comprising an electronic processor for participating in an interactive session between a plurality of participants, comprising:
    an encoding module configured for encoding a media file for a real time exchange of communications between a plurality of participants, said media file comprising a plurality of frames each having a frame identifier;
    an embedding module configured for embedding a communication of said interactive session into said media file without encoding the at least 50% thereof, wherein said communication comprises a plurality of non-media frames each having a non-media frame identifier;
    a communication encoding device configured for encoding said communication, thereby to reduce segments having a value substantially similar to the value of said media frame identifier; and
    an interactive data session module configured for using said embedded media file in said real time exchange of communications.

16. The mobile communication terminal of claim 15, wherein said communication is a member of the group consisting of: an interactive game, a commerce session, a conference call, and a video conference call.

17. The mobile communication terminal of claim 15, wherein said mobile communication terminal is a cellular phone, said interactive session being performed via a cellular network.

18. A system for establishing a real time exchange of communications between a plurality of participants via a communication network, comprising:
- a sending communication terminal configured for embedding a media file with a non-media communication of the real time exchange and wirelessly sending said embedded media file over a wireless network, said media file comprises a plurality of media frames each having a media frame identifier, wherein said non-media communication comprises a plurality of non-media frames each having a non-media frame identifier; and
- a receiving communication terminal configured for receiving said embedded media file via said wireless network, for separating between said media file and said non-media communication in accordance with said non-media frame identifiers and for playing said media file and processing said non-media communication together;
- wherein said sending communication terminal is configured for concealing said non-media communication by reducing segments having a value substantially similar to the value of said media frame identifier before said embedding;
- wherein said receiving communication terminal comprises a decoding unit for playing said embedded media file, said sending communication terminal being configured for concealing said non-media communication from said decoding unit.

19. The system of claim 18, wherein said media file comprises a plurality of media frames each having a media frame identifier and said separating is further in accordance with said media frame identifiers.

* * * * *